Feb. 11, 1930.                G. B. AMBLER                1,747,098
                                 LOOM
                          Filed April 19, 1926          7 Sheets-Sheet  3

Inventor:
George B. Ambler,
by Emery Booth, Janney & Varney
Attys.

Feb. 11, 1930. G. B. AMBLER 1,747,098
LOOM
Filed April 19, 1926 7 Sheets-Sheet 5

Feb. 11, 1930. G. B. AMBLER 1,747,098
LOOM
Filed April 19, 1926 7 Sheets-Sheet 6

Inventor:
George B. Ambler,
by Emery, Booth, Janney & Varney
Attys.

Patented Feb. 11, 1930

1,747,098

UNITED STATES PATENT OFFICE

GEORGE B. AMBLER, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS

LOOM

Application filed April 19, 1926. Serial No. 102,878.

This invention relates to looms and one of the principal objects thereof is to provide a loom for weaving a fabric in which the successive picks of filling are widely spaced and one adaptable particularly to heavy materials. A coordinate object is to provide various improvements adaptable to needle looms.

My invention will be best understood by reference to the following description of an illustrative embodiment thereof shown by way of example in the accompanying drawings, wherein:

In Fig. 6 the position of the parts is substantially as in Fig. 2;

Figs. 7 to 10 inclusive are diagrammatic longitudinal sections illustrating the steps of inlaying the filling. Fig. 7 corresponds substantially to Fig. 4 and Fig. 8 to Fig. 6;

I have herein shown as an example of my invention a needle loom more particularly designed to weave a fabric from fiber reed for the production of articles of wickerware such as baby carriage bodies. The fabric is a wicker fabric of the type known as a stake and strand fabric. In the production of basketware articles by hand a number of lengths of the material are arranged in more or less parallel relation and about these a filling strand is interwoven. The first mentioned lengths of material are called "stakes" and in the finished product are straight, except in so far as they may be curved to the general contour of the article to be made, and are relatively widely spaced, while the filling is denominated the "strands" and is usually closely arranged and is sinuously bent around the stakes. Similar fabrics are woven on looms wherein the warps form the stakes of the completed fabric and the filling the strands. In the loom herein disclosed, on the contrary, the warps form the strands of the completed wicker fabric and the picks of filling, or wefts, form the stakes and are relatively widely spaced and lie straight in the plane of the fabric, the warps being sinuously bent about them. Thus, in manufacturing a fabric to be used for baby carriage bodies and furniture from so-called fiber reed of about an eighth of an inch in diameter the strands, or warps, may be disposed substantially in contact while the stakes, or wefts, may be spaced about an inch apart. In other words, the loom may weave a fabric having about one pick per inch. Obviously this method of production of a stake and strand fabric by inserting as weft the stakes as distinguished from the strands permits a much more rapid production of fabric of a given width.

Figure 1:
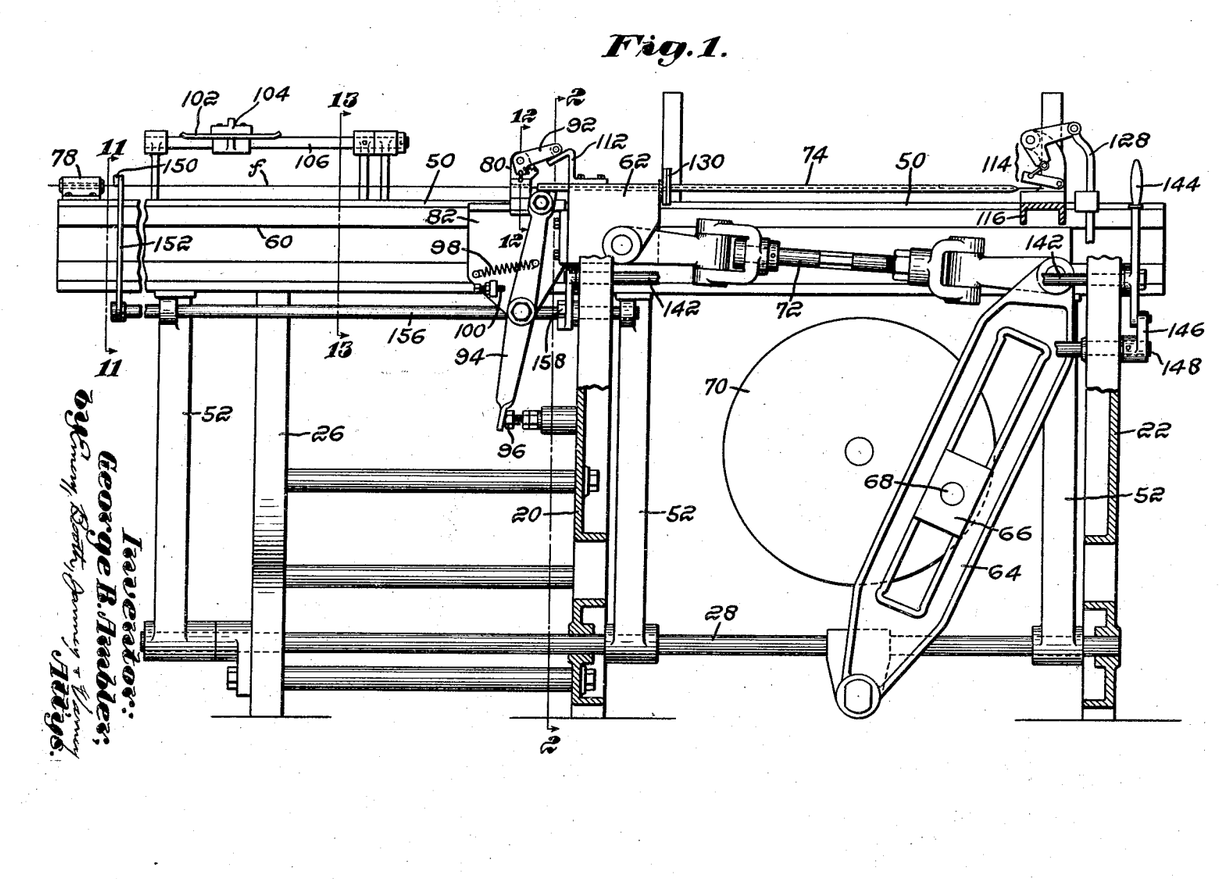
Fig. 1 is a transverse section taken along line 1—1 of Fig. 2 passing rearwardly of the breast beam and forwardly of the lay beam with parts broken away.
Figure 2:
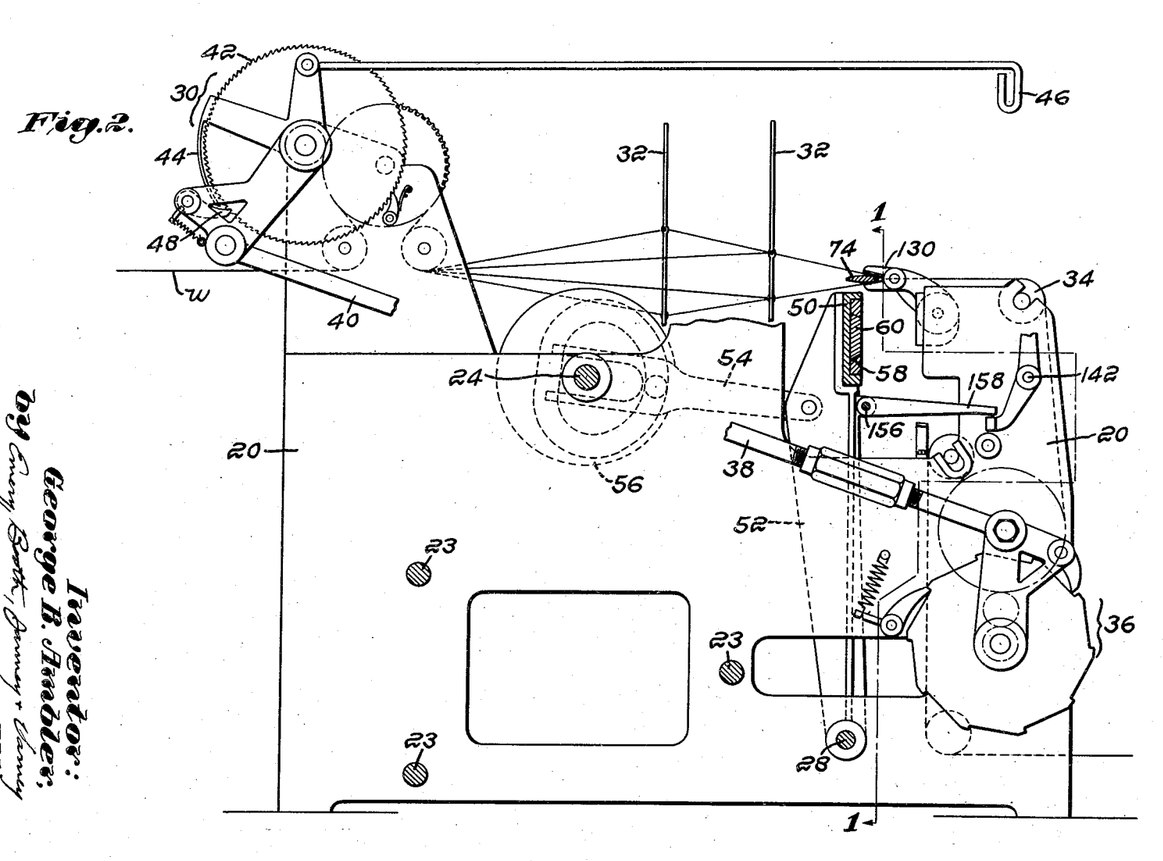
Fig. 2 is a longitudinal section on line 2—2 of Fig. 1 with parts broken away.

Referring particularly to Figs. 1 and 2, the principal mechanisms of the loom are organized between the two side frames 20 and 22 spaced by girts 23 and between which extends (see Fig. 2) the main shaft 24 from which most of the mechanisms hereinafter to be described are driven. An outboard frame or upright 26 (see Fig. 1) may also be provided providing a further bearing for the shaft 24 and for the rock shaft 28 presently to be described. The warps $w$ lead through a suitable let-off mechanism 30 through shedding mechanism 32 of any suitable kind and not necessary herein to illustrate in detail or to describe and the woven fabric continues over the breast roll 34 to take-up mechanism 36. The take-up mechanism 36 is positively driven to take up during each cycle of the loom a fixed length of fabric corresponding to the desired distance between the stakes or picks. I have herein shown a suitable ratchet mechanism operated through connecting rod 38 from the main shaft 24. The let-off 30 is also positively driven to let off a length of warp exactly corresponding to the length taken up by the take-up mechanism 36 and I have herein shown a ratchet mechanism driven by a pitman 40 from the main shaft 24. To provide, however, for proper tensioning of the warps as they pass through the loom the effective stroke of the let-off mechanism may at times require adjustment and I have herein shown the driven ratchet wheel 42 as provided with relatively small teeth over which the segmental shield 44 may be manually moved, conveniently by means of a handle 46 disposed at the front of the loom, this shield determining the point in the stroke of driving pawl 48 at which it will be permitted to engage with the teeth. This type of mechanism for adjusting the throw of a ratchet wheel is in itself well known.

Referring now to Fig. 1, the picking mechanism herein disclosed comprises a reciprocating needle of the protracting type which is projected into the shed on its forward stroke to carry the pick of filling therein and which releases the filling on its outward stroke to deposit the pick in the shed. Herein the needle is mounted on an oscillating lay-beam 50 which may resemble in many ways the lay-beam of a conventional loom, being here shown as mounted on swords 52 mounted on rocker shaft 28. The lay-beam may be oscillated (see Fig. 2) by pitmen 54 connected to the swords 52 and operated by grooved cams 56 on shaft 24, the design of the cams being such as to provide a prolonged dwell for the lay-beam in its forward position shown in Fig. 2, as is indicated by the cam path shown in that figure. The purpose of this dwell will hereinafter appear. While I have denominated the part 50 a lay-beam because of its great similarity to the lay-beam of an ordinary loom, it carries no reed or similar beat-up mechanism.

The left hand end of the lay-beam 50, viewing Fig. 1, corresponding to the position of the usual shuttle box, is extended to provide an under-cut guideway 58 of suitable length in which slides a dovetailed rib 60 on the block-like base portion 62 (see Fig. 1) of the needle. This base is reciprocated along the guideway in any suitable manner and I have herein shown a rocker arm 64 which is oscillated because of the engagement with the sliding block 66 carried by said arm of the wrist pin 68 of a driven crank disc 70, the rocker arm being connected to the base 62 of the needle by a connecting rod 72 suitably jointed to permit the desired movement of the lay-beam 50. Overhung from the base 62 is the body 74 of the needle of sufficient length to extend through the shed and which is adapted to maintain the filling strand $f$ extended in line therewith and herein (see Fig. 7) the body 74 of the needle is preferably provided with a bore 76 which loosely receives yet closely confines against lateral buckling or bending the filling strand $f$. The body of the needle 74 preferably has the section illustrated in Fig. 9 having a portion forwardly of the bore 76 tapered to a blunt or rounded forward edge adapted to correspond substantially to the sinuosities of the warps in the completed fabric, the distance between the forward edge and the center line of the bore 76 being suitably related to the desired spacing the picks of filling, as will hereinafter appear. Rearwardly of the bore 76 the needle may be gently tapered as shown, being, as it were, stream lined. In ship-building parlance, referring to the section shown in Fig. 7, the needle has a full entrance and a fine run.

Figures 11, 12, 13, 14:
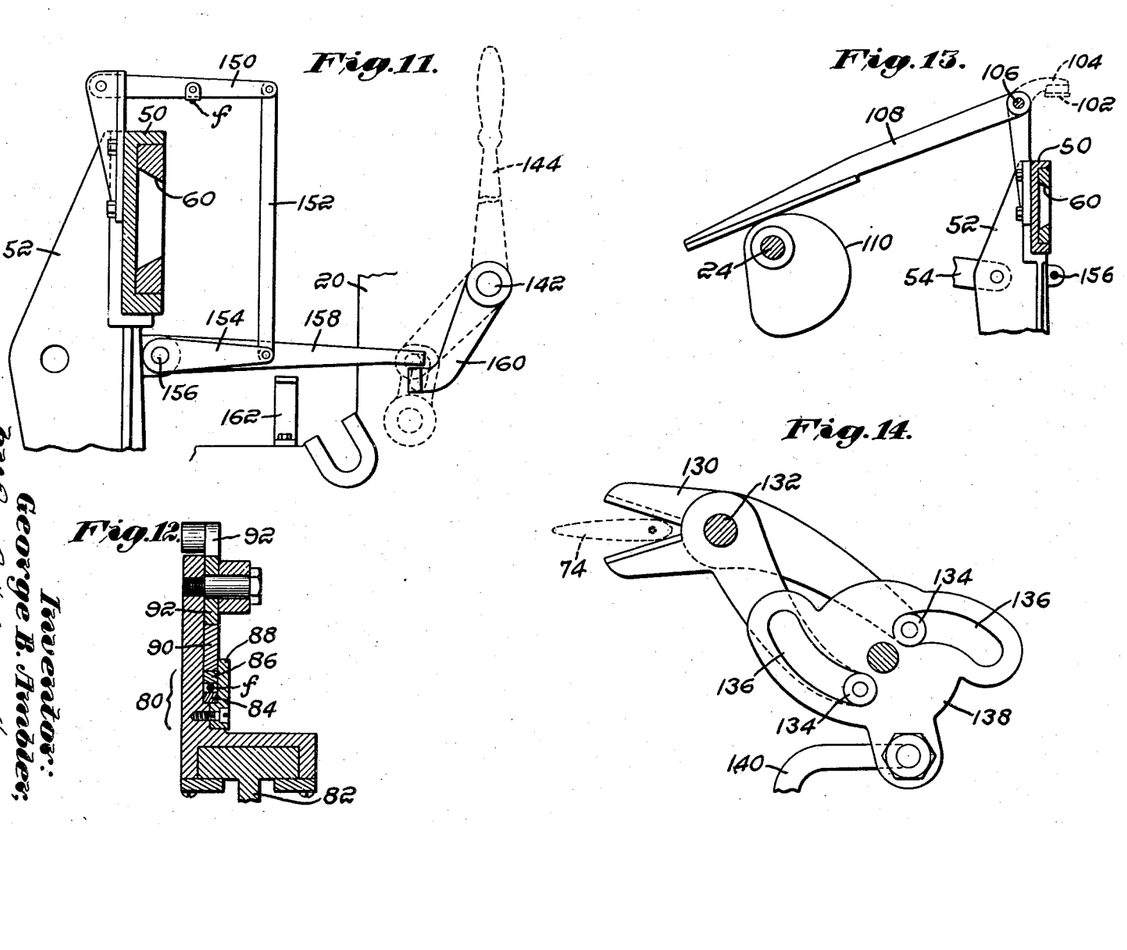
Figs. 11, 12 and 13 are simplified sections taken on the correspondingly numbered lines of Fig. 1 and are on an enlarged scale.
Fig. 14 is a side elevation of the filling cutter.

The filling $f$ leads to the rear or outer end of the needle body 74 through a suitable guide 78 at the outer end of the lay-beam 50 and through a gripper mechanism 80 herein shown as mounted on an extension 82 on the base 62 of the needle at the outer end of the elongated body portion 74 thereof. This gripper may be similar to that disclosed in my Patent No. 1,564,506, dated December 8, 1925, and the description thereof herein may therefore be brief. Referring to Figs. 1 and 12, the gripper 80 may comprise a fixed jaw 84 over which the filling $f$ leads and against which it is pressed by a movable jaw 86 sliding in the guideway 88 by means of the pivoted strut 90 interposed between said movable jaw 86 and one arm of a bell crank lever 92, the swinging of which, under the control of suitable mechanism hereinafter to be described, controls the position of the movable jaw 86, the strut 90 and the arm of the bell crank with which it engages acting in the manner of a toggle to raise and lower the movable jaw 86 away from and towards the fixed jaw 84 respectively to release and clamp the filling strand.

Herein the gripper mechanism 80 is mounted for differential movement relatively to the body 74 of the needle and for this purpose, as best seen in Fig. 12, the extension 82 of the base 62 of the needle may be of T-shaped section, the cross-bar of the T forming a guideway on which the gripper mechanism may slide inwardly and outwardly towards or away from the rear end of the needle body 74. I have herein shown the gripper as adapted to be moved by means of a lever of the first class 94 pivoted to the depending web of the extension 82 and having a forked end connected to the base of the gripper 80 and the other end adapted to contact with a suitable adjustable stop 96 mounted at the loom side, herein on the side frame 20. The lever 94 is normally swung counterclockwise by means of a spring 98 against the stop screw 100 to position the gripper towards the left of its guideway. However, as the needle completes its inward stroke the end of lever 94 will contact with stop 96 and the lever will be swung clockwise advancing the gripper towards the right and to the position illustrated in Fig. 1, the gripper moving differentially to the base 62 of the needle while also partaking of the movement thereof.

In the preferred cycle of operation, as will more fully appear in the detailed description of the method of operation which will follow, the gripper jaws are closed shortly after the inward stroke of the needle begins in order to hold the filling so that such inward movement of the needle will carry a length thereof into the shed. They are opened in the completion of said inward stroke to release the filling and retreat in open position so that the shot of filling is deposited in the shed. This governing of the mechanism may be effected in any suitable manner. For closing the gripper I have herein shown a driven element 102 having an extended surface along which the arm of bell crank lever 92 may travel and which is lowered at proper times from the position of Fig. 3 to the position of Fig. 4 to depress that arm and move the gripper jaws to closed position. For this purpose (see Fig. 13) the element 102 is supported on an arm 104 on a rock shaft 106 carried on brackets on the lay-beam 50 and extending parallel to the guideway 60, which rock shaft may be controlled by a lever arm 108 attached thereto oscillated at proper intervals by means of a large cam 110 on the shaft 24. To release the gripper a short trip or cam 112 (Fig. 1) may be mounted on the base 62 of the needle, said trip having an oblique surface up which the end of the upwardly extending arm of bell crank lever 92 may ride as the gripper mechanism finishes its travel towards the right under the action of lever 94 and at the completion of the stroke of the needle as a whole. The bell crank lever 92 will then be rocked counterclockwise and the jaws will be opened to release the filling strand.

Figure 15:
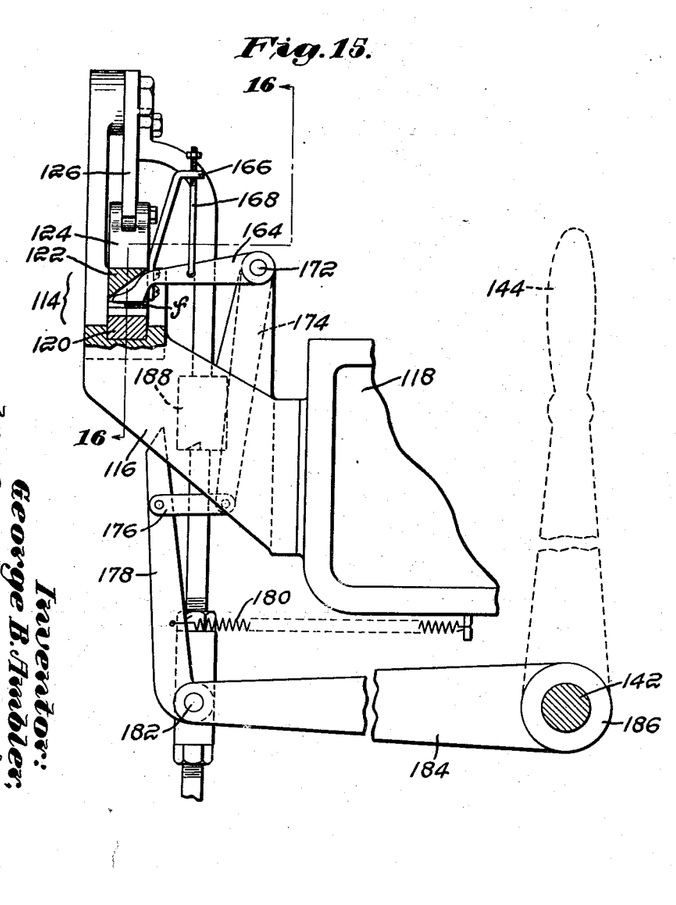
Fig. 15 is partly an end elevation, partly a section showing the filling receiving device and cooperating mechanism.
Figure 16:
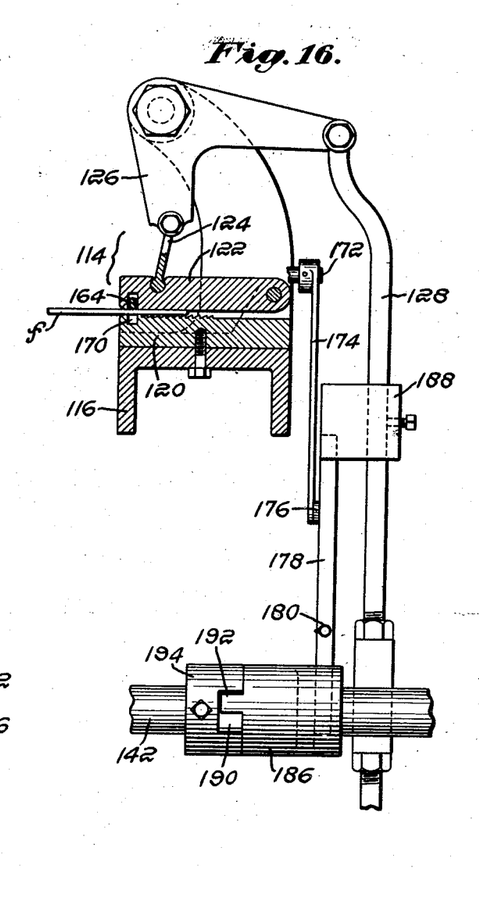
Fig. 16 is partly a front elevation of the same and partly a section on line 16—16 of Fig. 15.

The end of the filling strand which extends through the body 74 of the needle is delivered at the further side of the loom to suitable receiving mechanism 114, shown more in detail in Fig. 16 and conveniently mounted as shown in Fig. 15 in a stationary position on a bracket 116 carried by the breast beam 118 of the loom. The gripper 114 may embody a fixed lower jaw 120 against which is adapted to close the pivoted upper jaw 122 adapted to be swung by means of a toggle mechanism comprising the connecting link or strut 124 and the arm 126 of a bell crank lever which is oscillated by a pitman 128 driven from a suitable cam on the cam shaft of the loom by connections not necessary to show. When the parts are in the position shown in Figs. 16 and 6, upward movement of the pitman 128 under the influence of its controlling cam swings the arm 126 of the bell crank lever counterclockwise and breaks the toggle formed by the link or strut 124 and the arm 126 of the bell crank, moving the parts to the position shown in Figs. 3, 4 and 5 and lifting the upper movable jaw 122 of the gripping mechanism. Downward movement of the pitman straightens the toggle towards the position shown in Figs. 6 and 16, causing the jaws to exert a powerful clamping pressure on the filling $f$ received between them.

Figure 7:
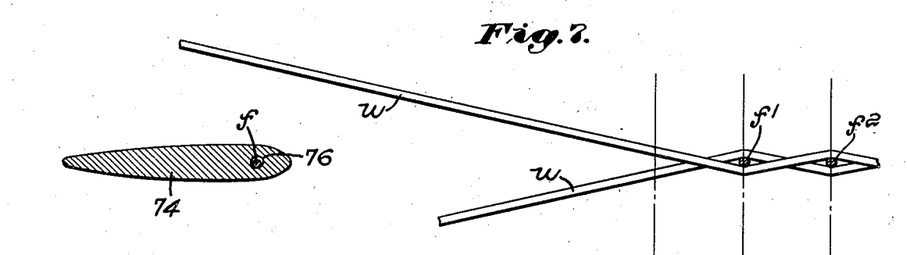
Figure 8:
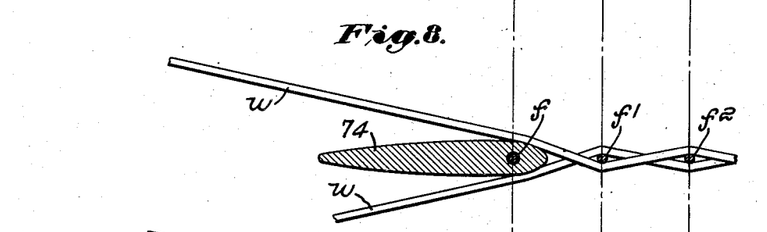
Figure 9:
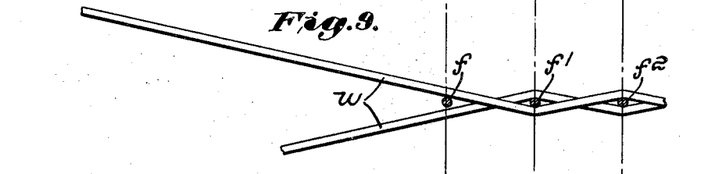
Figure 10:
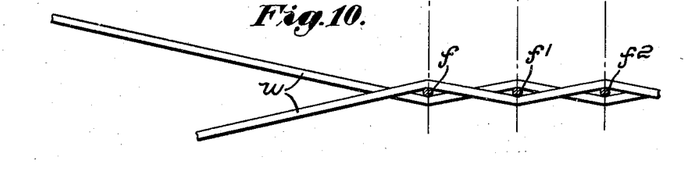

I have now described in considerable detail the principal operating members of the mechanical embodiment of my invention illustrated. I will now describe the manner in which they operate. Referring to Figs. 7, 8, 9 and 10, the pick of filling $f^1$ has been inserted in the fabric, the warps $w$ have been crossed to confine the same and to form a new shed and the positively driven take-up mechanism 36 (Fig. 2) has been operated to advance the pick of filling to the position shown in Fig. 7. While this is taking place the lay-beam has swung back to carry the body of the needle 74 to the position shown in Fig. 7 and the needle has travelled into the shed carrying with it the new pick of filling $f$. As will more fully appear hereinafter, as the needle traverses the shed the lay-beam advances, and as the inward movement of the needle is complete the parts have reached the position shown in Fig. 2 and the lay-beam has brought the body 74 of the needle to the position shown in Fig. 8 with the bore 76 thereof carrying the filling $f$ a definite distance from the previously inserted pick of filling $f^1$. The forward edge of the needle is driven up to the fell of the cloth, its tapered forward edge being forced between the warps and accurately aligning the crossings thereof parallel to the preceding pick $f^1$ and to the bore 76 of the needle which thus serves as a gage determining the position of the bore 76 relative to the preceding parts of the fabric and consequently the position in the completed fabric of the pick or shot of filling $f$ carried in the bore. The needle has a prolonged dwell in this forward position which continues throughout its outward stroke and it is withdrawn from the shed in the position shown in Fig. 8, depositing the pick of filling accurately parallel to and at a determined distance from the preceding pick $f^1$, as shown in Fig. 9. As the needle leaves the warps at the conclusion of its outward movement, the shed is changed. The movement of the shedding mechanism may be commenced during the outward movement of the needle, the warps dragging over the smooth outer surface of the same, provided, of course, that it does not proceed so far as to clamp them about the needle. When the needle has left the shed the lay-beam commences to retreat to bring the needle opposite the open part of the shed, as shown in Fig. 7, the warps close about the inserted filling *f* to confine the same and the take-up mechanism then operates to advance the length of filling *f* in Fig. 10 to the position there occupied by the length of filling *f*¹ and the parts resume the position of Fig. 7 and the cycle is repeated.

Figure 3:
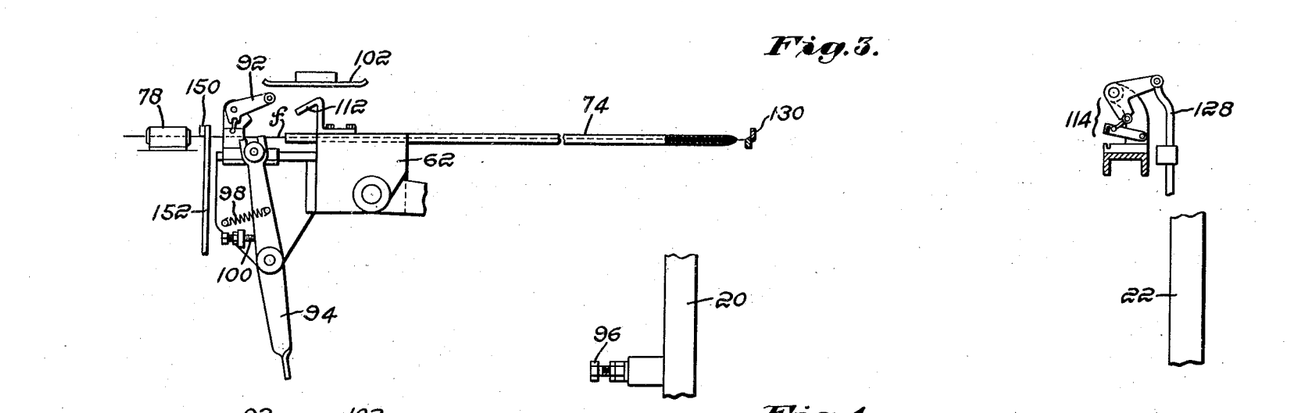
Figs. 3 to 6 inclusive are skeletonized views as seen from the point of view of Fig. 1 illustrating successive positions of the picking mechanism during the cycle.
Figure 4:
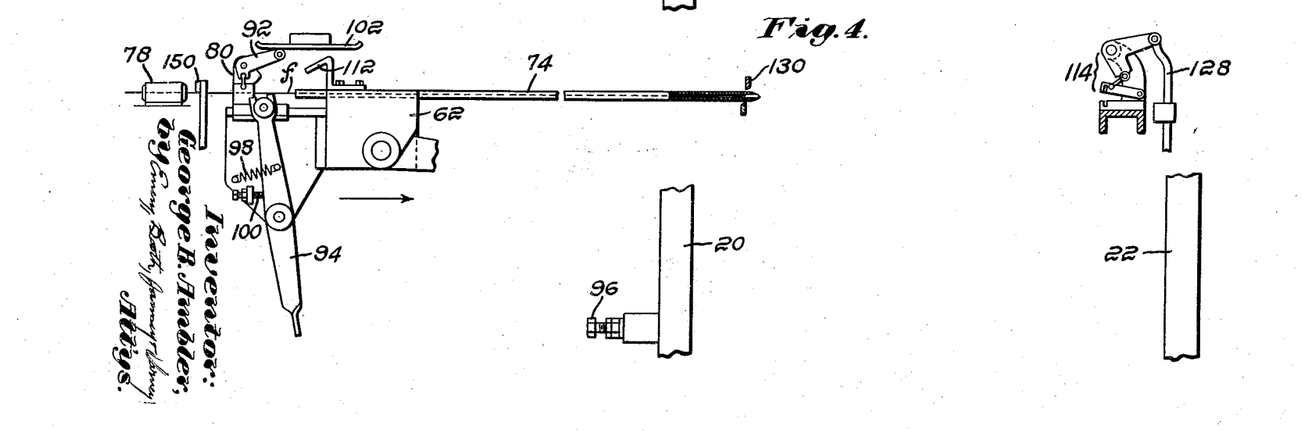
Figure 5:
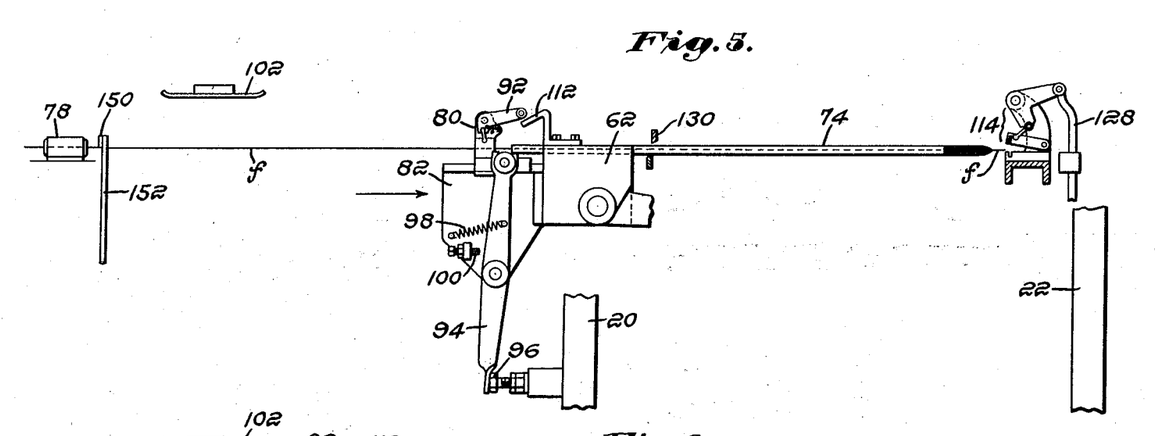
Figure 6:
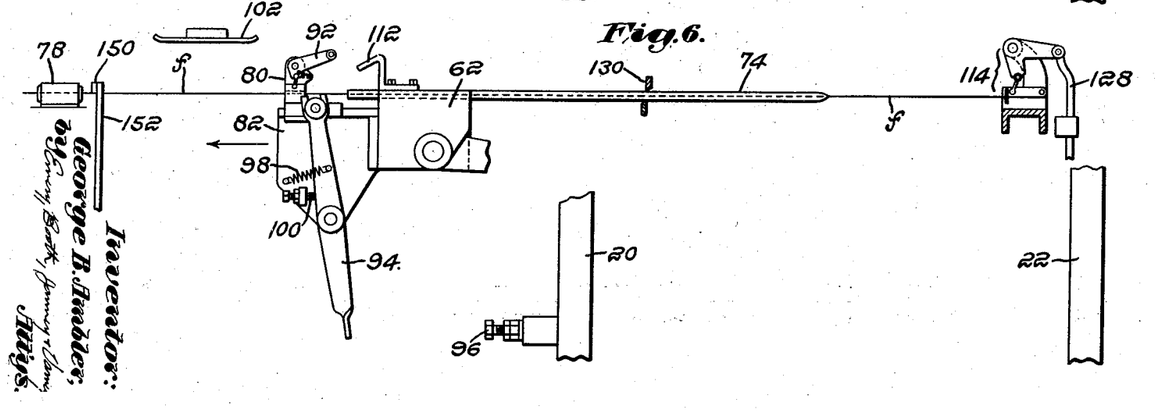

Referring now to Figs. 3, 4, 5 and 6, I will now describe the method of operation of the picking mechanism, that is to say, the needle and its associated mechanisms. In Fig. 3 the needle has completed its outward stroke and the length of filling which has been inserted in the shed is severed from the main supply closely adjacent the inner end or nose of the needle body 74 by means of the cutter blades 130 conveniently of the type more fully hereinafter described. Substantially at the same time the jaws 114 which hold the further end of the inserted length of filling are opened, releasing the filling which is now secured in the fabric by the crossing of the warps to form the new shed and permitting it to be advanced forwardly by the take-up mechanism. As soon as the filling is severed, as shown in Fig. 5, the dwell of the lay-beam in its forward position ceases, the lay-beam retreats to carry the needle towards the more open part of the shed and simultaneously the needle starts to move forwardly into the shed. In the first part of the inward movement of the needle the jaws of the gripping mechanism 80 are open so that the hollow body 74 of the needle slides freely over the filling until the end thereof passes the severed end of the filling, as shown in Fig. 4. The member 102 is then swung downwardly to depress arm 92 of the gripping mechanism and close the jaws to clamp the filling. As the needle now travels through the shed it will carry the filling with it but the end of the filling will be in back of the nose thereof and not projecting in such a manner that it might be caught against the adjacent warps. This is of particular importance because to permit the incessant reciprocation of the needle it preferably commences to enter the shed before the latter is fully open and also in the latter part of its movement commences to advance with the lay-beam towards its most forward position to a less open part of the shed.

In order, however, to deliver the end of the filling to the gripping mechanism 114 the filling is advanced to project the end thereof beyond the nose of the needle as the stroke of the needle is completed. This is effected by the differential movement of the gripping mechanism 80, as illustrated in Fig. 5. As the needle approaches its limit of movement the end of lever 94 strikes abutment 96 and moves the gripper 80 along its guideway from the position of Fig. 4 to the position of Fig. 5, pushing the length of filling through the body of the needle where it is so closely confined that it cannot buckle but must move lengthwise as does the wire in a Bowden wire mechanism and the end of the filling is thus projected from the nose of the needle as illustrated in Fig. 5 and it passes between the open jaws of the gripping mechanism 114 which close on the same by operation of the pitman 128 in the manner already described. As the needle finishes its movement and the gripper 80 completes its travel towards the right by a movement slightly beyond the position of Fig. 5, the arm of the bell crank 92 rides up on the inclined surface of the trip 112 and the gripper is opened to release the filling. The parts are now ready for the outward stroke which is shown half completed in Fig. 6, the gripper 80 being open, the filling being held by the clamping mechanism 114 and the entire needle mechanism retreating idly, the filling being drawn through the bore of the body 74 of the needle, the gripper 80 assuming its position on the left of its guide under the influence of spring 98 and all the parts returning to the position of Fig. 3 for completion of the cycle.

The severing mechanism and the cutting jaws 130 already referred to may be of any suitable form but I have herein shown (see Fig. 14) a pair of shear-like blades pivoted at 132 on the breast beam of the loom and opening to such an extent as to permit the body 74 of the needle to retreat between them when in its forward position, as illustrated in Fig. 14, and adapted to close equally and oppositely to the center line of the bore 76 of the needle to chop off the length of filling without any tendency to displace it from that line. Herein the shear blades are provided with extensions similar to the handles of an ordinary pair of scissors and carrying offset anti-friction rollers 134 which work in eccentric slots 136 of a pivoted disc 138 which is oscillated by a pitman 140 suitably cam-driven from the power shaft of the loom. Referring to Fig. 14, it will be understood that if the disc 138 is swung counterclockwise from the position shown, the rolls 134 will be swung outwardly from the center of the disc because of the eccentricity of the slots and that the cutting jaws will be correspondingly brought together and the jaws will be opened similarly on reverse movement of the disc 138.

To insure that the needle shall always be full and shall always deposit a shot of filling properly in the shed so that there shall be no danger that the positive take-up mechanism may advance the fabric on a mispick, suitable filling stop mechanisms are supplied controlled respectively by the supply of filling to the gripper 80 and consequently to the needle and the delivery of the length of filling from the needle to the receiving gripper 114. These may act on a rock shaft 142 (see Fig. 1), movement of which is effective in any usual or well known manner to throw the clutch or shipper which controls the application of power to the loom. In Fig. 1 the shaft 142 is broken away to disclose the mechanism at the rear but its purpose and function is graphically indicated by the showing of the hand-operated clutch-controlling lever 144 operated thereby and locked by the arm 146 (see Fig. 11) of well known form mounted on the idler shaft 148.

To insure that filling shall always be supplied to the gripper 80 to be drawn forward by the needle from the filling supply and that the needle shall always be full, a suitable feeler arm 150 is pivoted at the back of the lay-beam 50 and is adapted to be supported in the position shown in Fig. 11 by the length of filling $f$ extending between the guide 78 and the jaws of the gripping mechanism 80. A link 152 connects the end of feeler arm 150 with an arm 154, movement of which is adapted to swing a rock shaft 156 on which is carried a dagger 158. With the parts in the position shown in Fig. 11 with feeler arm 150 supported by the length of filling $f$, as the lay-beam 50 swings forward and back the dagger supported in the position shown and misses the arm 160 connected to the shaft 142. If, however, the filling $f$ is absent, the arm 150 drops, lowering through arm 154 the dagger 158 against the support 162, and in the forward movement of the lay-beam the dagger strikes the arm 160 and through shaft 142 shuts off the power to the loom.

In Figs. 15 and 16 I have shown the filling stop mechanism for insuring that filling is always supplied by the needle to the jaws of the gripping mechanism 114. For this purpose a feeler arm 164 works in a recess in the upper movable jaw 122, with which jaw the feeler is adapted to move by being suspended from a bracket 166 carried by the jaw by means of the rod 168 which permits a slight relative motion of the arm downwardly from the position shown so that it normally projects outwardly beyond the face of movable jaw 122. As the jaw closes downwardly, if the filling $f$ is present, it swings the feeler arm 164 clockwise, viewing Fig. 15, raising it to the position there shown, the rod 168 sliding upwardly through the bracket 166. If, however, the filling is not present, the feeler arm remains suspended in front of the face of the jaw 122 and can enter the recess 170 provided therefor in the face of the lower jaw. When filling is present and the feeler arm 164 is raised, its shaft 172 swings, swinging with it arm 174 which through link 176 moves the catch 178 to the left in Fig. 15 against the influence of the spring 180 which normally tends to swing that catch to the right on its pivot 182 on the end of arm 184, which arm is mounted on a sleeve 186 on the clutch-operating shaft 142. In this position the catch 178 misses the block 188 mounted on pitman 128. If, however, the filling is missing, the feeler arm 164 drops, the catch 178 is held by spring 180 in the path of block 188 and in the downward movement of the pitman 128 to close the jaw 122 this block will engage the end of the catch and thrusting substantially in line with the pivot 182 thereof will swing arm 184 counterclockwise in the figure so that clutch teeth 190 on the hub 186 thereof will, after a slight idle movement, engage the walls of recesses 192 formed in the collar 194 pinned to the shaft 142, in which recesses the clutch teeth work, and will operate the shaft to throw out the clutch.

I have described in considerable detail the particular mechanical embodiment of my invention shown in the drawings as an example thereof in order that the mechanical construction illustrated and its method of operation might be amply clear and not because the detailed construction shown is essential to my invention in its broader aspects. Obviously the mechanical embodiment of the invention might be widely varied and the principles thereof might be embodied in looms of a structure widely differing from that shown.

What I claim as new and desire to secure by Letters Patent I shall express in the following claims:

1. In a loom a lay-beam, means for moving it towards and away from the fell of the cloth providing for a dwell in the forward position, a filling-carrying needle mounted on the beam and means to reciprocate the same along the beam into and out from the shed timed to effect the retreating movement thereof during such dwell.

2. In a loom a lay-beam, a filling-inserting device reciprocating therealong to carry a length of filling into the shed and there to deposit it and means to oscillate said beam to cause said device to engage the fell of the cloth thereby definitely to space the inserted shot relatively thereto.

3. In a loom, in combination, a device for carrying a shot of filling into the shed, means to advance said device to bring a portion thereof against the fell of the cloth whereby definitely to position the shot of filling carried thereby relatively to the fell and means to release the filling from said device to be deposited in that position.

4. In a loom, in combination with positive take-up means for the warps, an oscillating lay-beam having a dwell in its forward position and an overhanging needle on the beam reciprocating along said beam and moving into the shed during the movement of said beam and withdrawing therefrom during said dwell to deposit a shot in the shed in definite position.

5. In a loom, in combination with positive take-up means for the warps, an oscillating lay-beam having a dwell in its forward position and an overhanging needle on the beam adapted to engage the fell of the cloth during said dwell, said needle reciprocating along said beam and moving into the shed during the movement of said beam and withdrawing therefrom during said dwell to deposit a shot in the shed in definite position.

6. In a loom, in combination with positive take-up means for the warps, an oscillating lay-beam having a dwell in its forward position, a needle reciprocating along said beam and adapted to protract a length of filling into the shed, a fixed gripping device to receive the filling from the needle, said needle adapted to retreat from the shed in line with said device and during the dwell of the beam.

7. In a loom, in combination with positive take-up means for the warps, an oscillating lay beam having a dwell in its forward position, a needle reciprocating along said beam having a longitudinal guide for the filling, means to clamp the filling to the needle during the inward motion of the latter whereby to protract the same into the shed and a fixedly located device for receiving the filling from the needle, said needle retreating in line with said device during the dwell of the beam.

8. In a loom a lay-beam, means for oscillating the same with a dwell in its forward position, an overhanging needle for inserting filling carried by the lay-beam and means to reciprocate the needle along the beam, the outward phase of such reciprocation and said dwell occurring substantially at the same time.

9. In a loom, in combination with warp take-up mechanism and shedding mechanism, an elongated member having a tapered forward edge, means to move the same into and out from the shed, means to move the same back and forth in the shed whereby in its forward position said member may engage the warps and said edge define a line of crossing thereof and means cooperating therewith to deposit a shot of filling in the shed in definite spaced relation to said edge.

10. In a loom, in combination with warp take-up mechanism and shedding mechanism, an elongated member having a tapered forward edge, means to move the same into and out from the shed, means to move the same back and forth in the shed whereby in its forward position said member may engage the warps and said edge define a line of crossing thereof, said member having a lengthwise bore definitely spaced rearwardly from said edge to receive a shot of filling and cooperating means to engage the filling to hold it for deposit in the shed on withdrawal of said member.

11. In a loom, in combination with warp take-up mechanism and shedding mecha- nism, an elongated member having a tapered forward edge, means to move the same into and out from the shed, means to move the same back and forth in the shed whereby in its forward position said member may engage the warps and said edge define a line of crossing thereof, said second means providing for a dwell of said member in said forward position during which it is withdrawn by said second means and cooperating means to inlay a shot of filling in the shed during said dwell in definite spaced relation to said edge.

12. In a loom, in combination with shedding means, means moving forwardly in the shed to engage the warps and determine location of the crossings thereof rearwardly of the previously inserted shot of filling and means positioned thereby to deposit a shot of filling in the shed at a definite distance rearwardly from said location.

13. In a needle loom a protracting needle including a body having provision for holding the filling extended in line therewith and a filling-gripping device mounted at the outer end of the body and movable relatively thereto axially thereof.

14. In a needle loom a protracting needle having a hollow body adapted to be protracted into the shed, a filling-gripping device mounted to slide at the outer end of the needle whereby to move the filling in said body and means controlling the sliding movement of said device.

15. In a needle loom a reciprocating protracting needle having a hollow body adapted to be protracted into the shed through which the filling freely passes, a gripping device at the outer end of the body movable towards and from the same, means to close said device after the needle has begun its inward stroke, means to open the same as the needle completes its inward stroke and means to move said device inwardly towards the body of the needle during the latter part of the inward stroke.

16. In a needle loom a reciprocating protracting needle having a hollow body adapted to be protracted into the shed through which the filling freely passes, a gripping device at the outer end of the body movable towards and from the same, means to close said device after the needle has begun its inward stroke, means to open the same as the needle completes its inward stroke and means to move said device inwardly towards the body of the needle during the latter part of the inward stroke comprising an arm connected thereto and an abutment at the loom side for engagement therewith.

17. In a needle loom a reciprocating protracting needle having a hollow body adapted to be protracted into the shed through which the filling freely passes, a gripping device at the outer end of the body movable towards and from the same, means to close said device after the needle has begun its inward stroke, means to move said device inwardly towards the body of the needle during the latter part of the inward stroke and a device carried adjacent the outer end of said body to engage said device to open the same at the conclusion of said movement.

18. In a needle loom a reciprocating protracting needle having a hollow body adapted to be protracted into the shed through which the filling freely passes, a gripping device at the outer end of the body movable towards and from the same, means to close said device after the needle has begun its inward stroke, means to move said device inwardly towards the body of the needle during the latter part of the inward stroke comprising an arm connected thereto and an abutment at the loom side for engagement therewith and a device carried adjacent the outer end of said body to engage said device to open the same at the conclusion of said movement.

19. In a needle loom a reciprocating protracting needle to carry the filling into the shed having a body to be protracted into the shed through which the filling passes and means differentially to advance the filling through said body at the conclusion of the inward stroke of the needle whereby to project the end of the filling from said body for reception by a filling-receiving device.

20. In a needle loom, in combination, a protracting needle comprising a reciprocating base, a hollow body overhung thereon to be projected into the shed, a guideway on the base at the outer end of said body, a filling-gripping device movable along said guideway, a lever of the first class pivoted on said base and having an end engaging said device and an abutment at the loom side to engage said lever.

21. In a needle loom, in combination, a protracting needle comprising a reciprocating base, a hollow body overhung thereon to be projected into the shed, a guideway on the base at the outer end of said body, a filling-gripping device movable along said guideway, a lever of the first class pivoted on said base and having an end engaging said device, a trip mounted adjacent the rear end of said body to throw open said device, means for closing said device at the beginning of the inward movement of the needle and an abutment at the loom side to engage said lever.

22. In a needle loom a reciprocating needle comprising an overhanging body having an inner end portion closely but loosely receiving the filling, a gripper located remote from the said end to grip the filling, said gripper being movable differentially to said body, and means to move the gripper inwardly during the latter part of the inward stroke of the needle whereby to move the filling through said end portion to protrude beyond the same for grasping by cooperating mechanism.

23. In a needle loom a reciprocating needle comprising an overhanging body having an inner end portion closely but loosely receiving the filling, a gripper located remote from the said end to grip the filling, said gripper being movable differentially to said body, governing means for the gripper to close the same at the beginning of the inward stroke of the needle and reopen the same at the conclusion of said stroke and means to move the gripper inwardly during the latter part of the inward stroke of the needle whereby to move the filling through said end portion to protrude beyond the same for grasping by cooperating mechanism.

24. In a needle loom a protracting needle which carries the filling into the shed to deposit it therein, gripping means to receive the filling from the needle, a feeler cooperating with the filling as it leads to the needle, a filling feeler cooperating with said gripping means and stop motions governed by said feelers.

25. In a needle loom, in combination with positive take-up means, picking means adapted to deposit a pick of filling in the shed in permanent spaced relation to the preceding pick of filling and comprising a filling carrier to draw the filling from a stationary supply and a gripper to receive the filling from said carrier, a feeler normally positioned by the filling as extended between said supply and carrier, a feeler normally positioned by the filling as held by said gripper and stop motions governed by said feelers.

26. In a needle loom, in combination with positive take-up means, picking means adapted to deposit a pick of filling in the shed in permanent spaced relation to the preceding pick of filling and comprising a filling carrier to draw the filling from a stationary supply and a feeler normally positioned by the filling as extended between said supply and carrier and a stop motion governed by said feeler.

27. In a needle loom, in combination with a protracting needle, a gripper associated therewith to carry the filling on inward movement of the needle, a gripper for receiving the filling from said needle, a guide from which the filling leads to said needle and between which and one or the other of said grippers it is extended in the normal operation of the loom, a feeler noramlly positioned by engagement with the extended filling between said guide and the needle and a stop motion governed by said feeler.

28. In a needle loom, in combination with a protracting needle, a gripper for receiving the end of the filling from said needle comprising a movable jaw to close on the filling, power means for operating the jaw, a feeler associated therewith and adapted to be moved relatively thereto by the filling, a device controlling the application of power to the loom and adapted to be positioned by said feeler alternatively to be engaged by or escape engagement with a part of said jaw-operating means.

29. In a needle loom, in combination with a protracting needle, a gripper for receiving the end of the filling from said needle comprising a jaw movable to close on the filling, a feeler associated therewith and adapted to be moved relatively thereto by the filling, a device controlling the application of power to the loom and adapted to be positioned by said feeler alternatively to be engaged by or to escape engagement with a power-moved part of the loom mechanism.

In testimony whereof, I have signed my name to this specification.

GEORGE B. AMBLER.